United States Patent
Ni et al.

(10) Patent No.: US 10,552,204 B2
(45) Date of Patent: Feb. 4, 2020

(54) INVOKING AN AUTOMATED ASSISTANT TO PERFORM MULTIPLE TASKS THROUGH AN INDIVIDUAL COMMAND

(71) Applicant: Google Inc., Mountain View, CA (US)

(72) Inventors: Yuzhao Ni, London (GB); David Schairer, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 7 days.

(21) Appl. No.: 15/644,157

(22) Filed: Jul. 7, 2017

(65) Prior Publication Data

US 2019/0012198 A1 Jan. 10, 2019

(51) Int. Cl.
| | |
|---|---|
| G06F 9/48 | (2006.01) |
| G10L 15/22 | (2006.01) |
| G10L 15/26 | (2006.01) |
| G06F 17/27 | (2006.01) |
| G06Q 10/02 | (2012.01) |
| G06F 3/16 | (2006.01) |

(52) U.S. Cl.
CPC .............. *G06F 9/4831* (2013.01); *G06F 3/16* (2013.01); *G06F 3/167* (2013.01); *G06F 9/4843* (2013.01); *G06F 17/2705* (2013.01); *G06Q 10/02* (2013.01); *G10L 15/22* (2013.01); *G10L 15/265* (2013.01); *G10L 2015/223* (2013.01)

(58) Field of Classification Search
CPC ..... G10L 15/18; G10L 15/1815; G10L 15/22; G10L 2015/223; G10L 2015/228; G10L 15/32; G10L 15/265; G06F 9/4843

USPC .............. 704/257, 270, 270.1, 275
See application file for complete search history.

(56) References Cited

U.S. PATENT DOCUMENTS

| | | | | |
|---|---|---|---|---|
| 5,748,191 | A * | 5/1998 | Rozak | G06F 3/16 704/E15.04 |
| 6,816,837 | B1 * | 11/2004 | Davis | G10L 15/26 704/275 |
| 8,165,886 | B1 * | 4/2012 | Gagnon | G10L 15/19 704/275 |
| 8,656,346 | B2 | 2/2014 | Kodi et al. | |

(Continued)

OTHER PUBLICATIONS

Lugibihl, Seth "You—Voice Commands BETA." Updated on Feb. 25, 2017. Google Play Store, 3 sheets [online] [last accessed Jun. 29, 2017], available in the Internet as URL: https://play.google.com/store/apps/details?id=text.you&hl=en.

(Continued)

*Primary Examiner* — James S Wozniak
(74) *Attorney, Agent, or Firm* — Middleton Reutlinger

(57) ABSTRACT

Methods, apparatus, systems, and computer-readable media for engaging an automated assistant to perform multiple tasks through a multitask command. The multitask command can be a command that, when provided by a user, causes the automated assistant to invoke multiple different agent modules for performing tasks to complete the multitask command. During execution of the multitask command, a user can provide input that can be used by one or more agent modules to perform their respective tasks. Furthermore, feedback from one or more agent modules can be used by the automated assistant to dynamically alter tasks in order to more effectively use resources available during completion of the multitask command.

20 Claims, 6 Drawing Sheets

(56) References Cited

U.S. PATENT DOCUMENTS

| | | | | |
|---|---|---|---|---|
| 8,812,298 | B1* | 8/2014 | Wolfram | G06F 17/2881 704/9 |
| 9,922,639 | B1* | 3/2018 | Belin | G10L 15/00 |
| 2001/0047265 | A1* | 11/2001 | Sepe, Jr. | G10L 15/22 704/275 |
| 2002/0191754 | A1* | 12/2002 | Liu | H04M 1/271 379/88.01 |
| 2007/0005368 | A1* | 1/2007 | Chutorash | B60R 16/0373 704/275 |
| 2007/0124147 | A1* | 5/2007 | Gopinath | G10L 15/19 704/257 |
| 2007/0124149 | A1* | 5/2007 | Shen | G10L 15/26 704/275 |
| 2008/0109292 | A1 | 5/2008 | Moore | |
| 2009/0024391 | A1* | 1/2009 | Grant | G10L 15/193 704/257 |
| 2009/0187407 | A1* | 7/2009 | Soble | G10L 13/00 704/260 |
| 2010/0123834 | A1* | 5/2010 | Brodersen | G08C 19/28 348/734 |
| 2010/0185445 | A1* | 7/2010 | Comerford | G10L 15/22 704/251 |
| 2010/0312547 | A1* | 12/2010 | Van Os | G10L 15/26 704/9 |
| 2011/0071819 | A1* | 3/2011 | Miller | G06F 17/273 704/9 |
| 2013/0198208 | A1* | 8/2013 | Mall | G06F 16/9535 707/754 |
| 2014/0067201 | A1* | 3/2014 | Visintainer | B60R 16/0373 701/36 |
| 2014/0164312 | A1* | 6/2014 | Lynch | G06Q 30/00 706/50 |
| 2014/0244259 | A1* | 8/2014 | Rosario | G10L 15/19 704/254 |
| 2015/0046153 | A1* | 2/2015 | Wolfram | G06F 17/2881 704/9 |
| 2015/0169336 | A1* | 6/2015 | Harper | G10L 15/22 715/706 |
| 2015/0212676 | A1* | 7/2015 | Khare | G16H 40/63 715/771 |
| 2015/0254057 | A1* | 9/2015 | Klein | G06F 3/167 704/275 |
| 2015/0254058 | A1* | 9/2015 | Klein | G06F 3/167 704/275 |
| 2016/0042735 | A1* | 2/2016 | Vibbert | G10L 15/1822 704/257 |
| 2016/0162475 | A1* | 6/2016 | Bondarenko | G06F 11/3636 704/9 |
| 2016/0225371 | A1* | 8/2016 | Agrawal | G06F 3/04842 |
| 2017/0103755 | A1* | 4/2017 | Jeon | G10L 15/22 |
| 2017/0185375 | A1 | 6/2017 | Martel et al. | |
| 2017/0213449 | A1* | 7/2017 | Tchedikian | G08C 17/02 |
| 2018/0121215 | A1* | 5/2018 | Charbonneau | G06F 8/38 |

OTHER PUBLICATIONS

European Patent Office; International Search Report and Written Opinion of PCT Ser. No. PCT/US2018/040808, dated Oct. 8, 2018; 12 pages.

* cited by examiner

INVOKING AN AUTOMATED ASSISTANT TO PERFORM MULTIPLE TASKS THROUGH AN INDIVIDUAL COMMAND

BACKGROUND

Automated assistants (also known as "personal assistant modules", "mobile assistants", or "chat bots") may be interacted with by a user via a variety of computing devices, such as smart phones, tablet computers, wearable devices, automobile systems, standalone personal assistant devices, and so forth. The automated assistants receive input from the user (e.g., typed and/or spoken natural language input) and respond with responsive content (e.g., visual and/or audible natural language output).

An automated assistant may provide a broad range of functionality through interactions with various local and/or third-party agents. For a user to utilize the automated assistant to perform a particular function, oftentimes the user must invoke the automated assistant (e.g., through particular verbal phrases and/or particular hardware inputs), then provide multiple invocation phrases associated with the particular function. In some instances, a large quantity of dialog turns may be required for the user to eventually get the automated assistant to perform a particular task. This can result in a waste of time for the user, as well as an inefficient use of computational resources for the automated assistant because the automated assistant must process and respond to each input from the user.

SUMMARY

The present disclosure is generally directed to methods, apparatus, and computer-readable media (transitory and non-transitory) for engaging an automated assistant to perform multiple tasks through a single command. The automated assistant can be an application that operates at a client device and/or server device, and has the ability to parse inputs from a user to determine what actions the user is requesting to be performed. In some implementations, the automated assistant can interpret certain inputs as being associated with multiple different tasks. Each task of the multiple different tasks can be associated with an application or an agent that can complete the task and/or provide information for completing a separate task. Depending on the input from the user, the tasks can be performed in serial, parallel, or a combination thereof.

In some instances, the user can request that the automated assistant plan a date night for the user and their significant other by speaking an input such as, for example, "Assistant, please plan a date night." The automated assistant can receive the input via an automated assistant interface of a client device and parse the input to determine the agents that should be involved with responding to the input. The specific input of planning a date night can cause the automated assistant to query, in parallel, a calendar agent and a restaurant selection agent. The calendar agent can be used by the automated assistant to determine a number of available nights that the user is free to have the date night. The restaurant selection agent can be used by the automated assistant to identify restaurants that are suitable for the date night. The automated assistant can optionally use the available nights from the calendar agent in selecting the restaurants (e.g., based on the restaurants being open on the available nights).

For example, the automated assistant can provide, as part of a request to the restaurant selection agent, values that define the available nights to thereby filter out particular restaurants that may not be able to host the user during the available nights. The automated assistant can then identify a reservation agent that can be utilized to make a reservation for one of the selected restaurants for the available night. In this way, the automated assistant is using parallel tasks (e.g., engaging the calendar agent and the restaurant selection agent) to obtain further information for use by a separate agent module (e.g., the reservation agent) to perform the subsequent task of booking the restaurant, thereby ultimately completing the original command of planning the date night. In some implementations, the subtasks for executing the command of planning the date night can be performed in series, thereby allowing each agent the opportunity to receive information from a previous agent in the series.

In some implementations, the automated assistant can receive an input that is associated with multiple different subtasks, and query the user for feedback during execution of the multiple different subtasks. For example, the user can request that the automated assistant plan a camping trip for the user by speaking an input such as, "Assistant, please plan a camping trip." The automated assistant can parse the input from the user and determine the agents that should be involved for responding to the input. For example, planning a camping trip can at least involve the subtasks of identifying a free weekend, booking a camp site, and obtaining camping gear. The subtasks of identifying a free weekend and booking a camp site can involve the automated assistant invoking a calendar agent and a travel agent associated with a travel website. Data from the calendar agent can be used by the automated assistant to determine an available weekend for booking the camp site. The travel agent associated with the travel website can be used to identify a campground that can be booked for the available weekend identified through the calendar agent. In response to a suitable campground being identified, the automated assistant can identify a campground agent associated with the identified campground. The automated assistant can determine, via output from the campground agent, that the campground offers camping gear rentals. The automated assistant can compare the output from the campground agent to the subtasks associated with the initial request of planning a camping trip. If, based on the comparing, there is a correlation between the output from the campground agent and at least one subtask, the automated assistant to generate a query for the user. For example, the query can be a request to provide feedback from the user.

The request for feedback can assist the automated assistant with completing the subtasks of both booking the camp site and obtaining camping gear. For example, the automated assistant can request feedback through an automated assistant interface of a client device using an output such as, "Ok, would you like to rent the camping gear?" If the user elects to rent the camping gear, the automated assistant can continue booking the camp site through the campground agent using the data from the calendar agent, along with a request to rent the camping gear. In this way, the automated assistant is able to use both feedback from the user and data from a first subtask to complete a second subtask. Alternatively, the campground agent can request feedback from the user via the automated assistant interface, with the automated assistant acting as an intermediary that, for example, provides a GUI for the request for feedback or provides audio corresponding to the request for feedback. Should the camping gear not be available to rent, the campground agent can provide feedback back to automated assistant, and the automated assistant can query the calendar agent for identifying another free weekend to book the camp site.

In response to receiving the feedback from the user, the automated assistant can interact with the campground agent to book the camp site at the identified other free weekend. Thereafter, the automated assistant can provide an output to the user such as, for example, "Ok, I finished booking your camping trip." If the user elected to not rent the camping gear, the automated assistant could complete the booking of the camp site using the data from the calendar agent and identify a shopping agent for assisting the user in purchasing camping gear. If the user purchases the camping gear through the shopping agent, the automated assistant can consider the subtasks of booking the campsite and obtaining the camping gear completed, and indicate to the user that the camping trip has been booked. In this way, multiple subtasks performed by the automated assistant can be dynamically influenced by input from the user during the execution of the subtasks.

The automated assistant can determine that an initial input from a user is associated with multiple different subtasks according to a variety of different methods. For instance, the user can configure a command with multiple subtasks through a graphical user interface (GUI) for controlling the automated assistant. For instance, if the user wants the automated assistant to know what the user means by "plan a date night," the user can open the automated assistant GUI and select, from a number of subtasks, the subtasks involved with the command "plan a date night." Alternatively, the user can engage in a human-to-machine dialog with the automated assistant for defining how the command "plan a date night" should be executed. For example, the user can provide the input, "Assistant, when I say 'plan a date night' this is what I'd like you to do . . . ," and thereafter describe the subtasks involved with planning the date night (e.g., identify an available night, book a restaurant, and send an invite).

In some implementations, the automated assistant can automatically query the user regarding configuring a multiple subtask command. In other words, the automated assistant can ask the user whether they would like the actions performed as a result of previous interactions between the user and the automated assistant to, in the future, be performed in response to a single command. The previous interactions can be identified and grouped by the automated assistant according to one or more common conditions associated with the previous interactions. In some implementations, the automated assistant can determine a correlation between interactions based on the interactions being within a threshold time period of each other (e.g., each of a first interaction, a second interaction, and a third interaction being initialized less than a threshold period of time of each other). In other implementations, the automated assistant can determine a correlation between the interactions based on the interactions being completed within a threshold session period of time (e.g., a first interaction, a second interaction, and a third interaction all completed less than a threshold session period of time). For instance, upon getting off work on a Friday, a user can query the automated assistant interface in their vehicle regarding what is happening over the weekend. Specifically, the user can ask a series of queries such as, for example, "Assistant, could you please check my social network and tell me what my friends are doing this weekend . . . could you check the city website and tell me what's going on tonight . . . could you check my networking application and tell me if people are getting together this weekend?"

Upon receiving the series of queries from the user and identifying that each query pertains to weekend events, the automated assistant can ask the user whether they would like to associate the series of queries with a single command. For instance, after the user has provided the series of queries, the automated assistant can provide a responsive output such as, "In the future, would you like this information in response to a single command such as 'Assistant, talk to me about this weekend.'" If the user elects to have the automated assistant create the single command, the automated assistant can store the single command in association with a group of subtasks, each corresponding to the series of queries from the user. Thereafter, when the user provides the input "Assistant, talk to me about this weekend," the automated assistant will collect weekend information from each of the social network, an agent module associated with the city website, and the networking application, and provide the collected weekend information as a responsive output to the user. This saves the user the trouble of repeating the series of queries, and conserves processing resources, as the automated assistant would no longer have to individually parse the series of queries.

In some implementations, a method implemented by one or more processors is set forth as including a step of determining that content of a natural language input provided to an automated assistant interface includes a command that corresponds to multiple subtasks to be performed by separate agent modules accessible to an automated assistant application. The automated assistant application can be configured to interface with a user via the automated assistant interface. The method can further include invoking a first agent module of the agent modules to perform a first subtask of the multiple subtasks, and in response to invoking the first agent module, receiving a first agent output from the first agent module. The method can also include invoking, with parameters based on the first agent output, a second agent module of the agent modules to perform a second subtask of the multiple subtasks. In some implementations, the second subtask involves processing the parameters. The method can further include, in response to invoking the second agent module, receiving a second agent output from the second agent module, and providing responsive output to the user, via the automated assistant interface, based on the first agent output and the second agent output. In some implementations, determining that the content of the natural language input includes the command can comprise: comparing the content to entries in an index that designates stored commands as multitask commands.

In some implementations, each of the first agent module and the second agent module can be third-party agent modules controlled by a corresponding third-party that is unique from a party that controls the automated assistant application. In yet other implementations, invoking the second agent module with the parameters based on the first agent output can include incorporating at least some of the first agent output into one or more of the parameters and providing, by the automated assistant application, the parameters to the second agent module.

In some implementations, the responsive output can correspond to a query for the user and the method can further include: receiving, at the automated assistant interface, an input from the user in response to the query, and causing the second agent module to process the input from the user. The second agent module can provide feedback to the automated assistant application in response to processing the input from the user. In response to the feedback satisfying one or more criteria, a third agent module can be invoked to perform a third subtask of the multiple subtasks using parameters based on the feedback.

In some implementations, a system is set forth as including one or more processors, and memory storing instructions that, when executed by one or more of the processors, cause one or more of the processors to perform steps that include determining that content of a natural language input provided to an automated assistant interface includes a command that corresponds to multiple subtasks to be performed by separate agent modules. The steps can further include invoking a first agent module to perform a first subtask and a second agent module to perform a second subtask, and receiving an output from the first agent module in response to the first agent module performing the first subtask. The steps can also include providing parameters, associated with the output from the first agent module, to the second agent module, and causing the second agent module to perform the second subtask with the parameters. The steps can further include, in response to at least the first subtask and the second subtask being performed, providing responsive output to the user, via the automated assistant interface.

In some implementations, the first subtask or the second subtask can be associated with booking a reservation for the user. In other implementation, the command can be a preconfigured multitask command previously stored in response to previous interactions of the user via the automated assistant interface. In yet other implementations, the first agent module and the second agent module are associated with separate third parties.

In some implementations, the steps can further include: providing, via the automated assistant interface, a query to the user regarding the output, and receiving a subsequent user input from the user. Furthermore, one or more of the parameters provided to the second agent module can be based at least in part on the subsequent user input received from the user.

In yet other implementations, a non-transitory computer readable medium is set forth as storing instructions that, when executed by one or more processors, cause the one or more processors to perform steps that include: determining that content of a natural language input provided to an automated assistant interface includes a command that corresponds to multiple subtasks to be performed by separate agent modules accessible to an automated assistant application. The automated assistant application can be configured to interface with a user via the automated assistant interface. The steps can further include invoking a first agent module of the agent modules to perform a first subtask of the multiple subtasks, and, in response to invoking the first agent module, receiving a first agent output from the first agent module. The steps can further include invoking, with parameters based on the first agent output, a second agent module of the agent modules to perform a second subtask of the multiple subtasks. The second subtask can involve processing the parameters.

In some implementations, determining that the content of the natural language input includes the command can include comparing the content to entries in an index that designates stored commands as multitask commands. In other implementations, each of the first agent module and the second agent module are third-party agent modules controlled by separate third-parties that are unique from a party that controls the automated assistant application.

In some implementations, invoking the second agent module with the parameters includes providing, by the automated assistant application, the parameters to the second agent module. In some implementations, the second subtask can include purchasing an item. In some implementations, the steps can include identifying, based on the content of the natural language input, the first agent module and a second agent module via an index that correlates the first agent module and the second agent module with the subtasks. The multiple subtasks can be associated with individual phrases previously provided by the user and stored by the automated assistant application.

Other implementations may include a non-transitory computer readable storage medium storing instructions executable by a processor (e.g., a central processing unit (CPU) or graphics processing unit (GPU)) to perform a method such as one or more of the methods described above and/or elsewhere herein. Yet another implementation may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
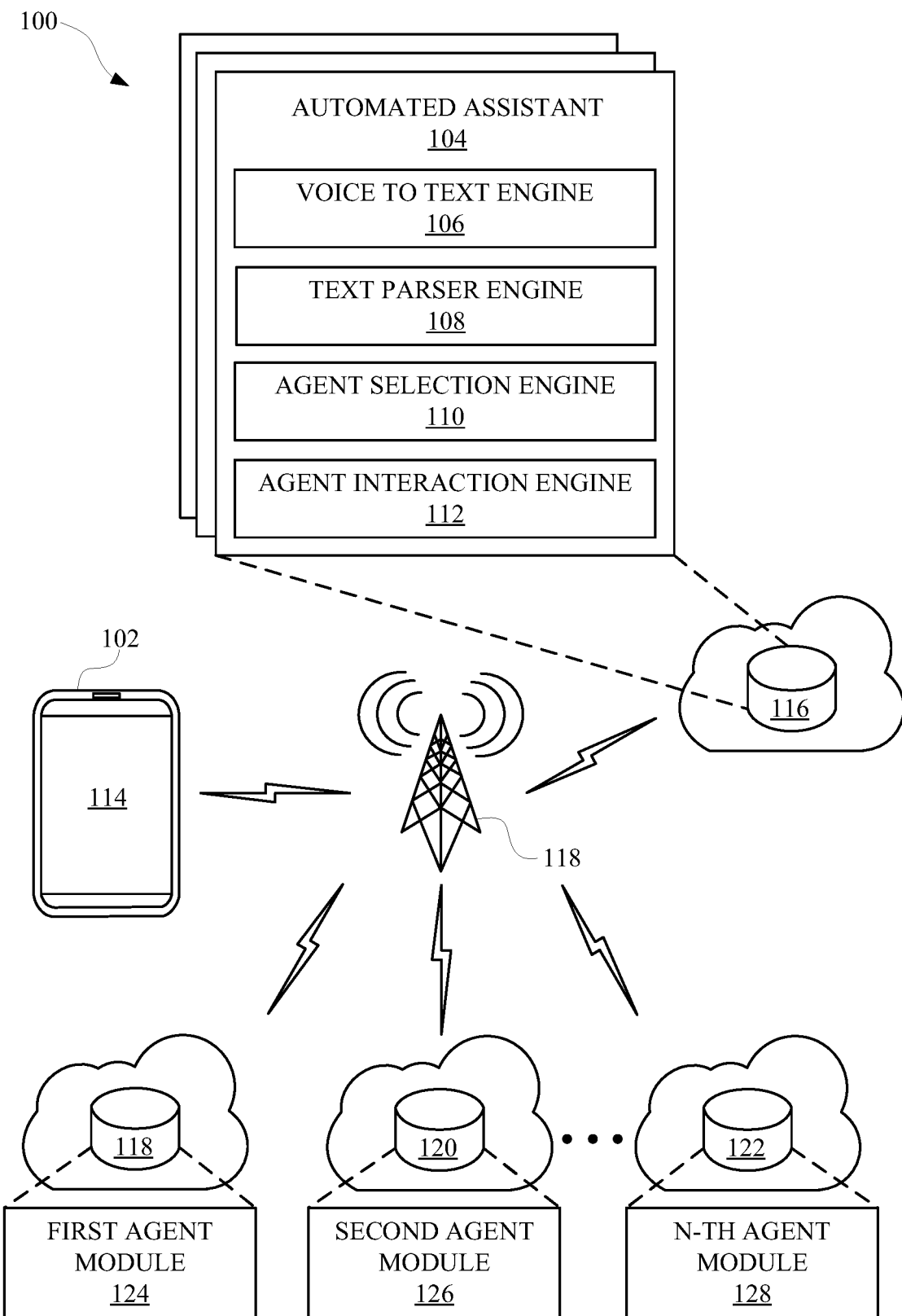
FIG. 1 illustrates a system diagram that includes an automated assistant capable of invoking multiple different agent modules in response to a command from a user.

FIG. 1 illustrates a system diagram 100 that includes an automated assistant 104 capable of invoking multiple different agent modules in response to a command from a user. The automated assistant 104 can be accessed by a user through a client device 102 that is connected to a remote device 116, such as a server device, which can host the automated assistant 104. The automated assistant 104 can receive textual or audio inputs from the client device 102 and interpret the inputs for performing actions to assist the user. The automated assistant 104 can use a voice to text engine 106 for converting audio inputs into text or other medium that can be further processed by the automated assistant 104. The automated assistant 104 can further include a text parser engine 108 that can process textual input, or text converted from an audio input, and convert the input into instructions for execution by the automated assistant 104 and/or one or more agent modules.

In some implementations, the text parser engine 108 can determine whether an input corresponds to a multitask command. When the text parser engine 108 determines that an input corresponds to a multitask command, an agent selection engine 110 can be employed to identify the agent modules that should be invoked for completing the multiple tasks involved in executing the command. An agent module can be an application that is accessible to the client device 102 over a network and associated with a native application on the client device 102, or a website accessible to the client device 102. In some implementations, the agent module can be a third party application that is provided by an entity that is different than an entity that provides an operating system the client device 102 or other software on the client device 102. Alternatively, the agent module can be a first party application that is provided by the entity that also provides the operating system or other software for the client device 102. The automated assistant 104 can access an index that correlates agent modules to various functions, and use the index to determine the agent modules that are suitable for completing the multitask command provided by the user.

The agent modules can be managed by separate remote servers and the automated assistant 104 can access the remote servers over a network 130. When the automated assistant 104 identifies the agent modules suitable for completing the multitask command, an agent interaction engine 112 can delegate tasks to each identified agent module. The automated assistant 104 can invoke each agent module to perform one or more tasks of the delegated tasks by transmitting a signal over the network 130 to each server device that hosts an agent module. For example, the automated assistant 104 can access a first server 118, a second server 120, and an Nth server 122 that each host a first agent module 124, a second agent module 126, and an Nth agent module 128, respectively.

Depending on the multitask command provided to the automated assistant 104 from the user, the agent interaction engine 112 can delegate tasks to the agent modules in a series or in parallel. For example, the agent interaction engine 112 can provide tasks in series by first delegating a first task to the first agent module 124. In response to the first agent module 124 providing an output to the automated assistant 104, the automated assistant 104 can provide a second task to the second agent module 126. Thereafter, in response to the second agent module providing an output to the automated assistant 104, the automated assistant 104 can provide an Nth task to the Nth agent module 128. This process can continue until each task of the multiple tasks corresponding to the input command from the user is complete.

The agent interaction engine 112 can delegate tasks in parallel by simultaneously assigning multiple tasks to multiple different agent modules (e.g., the first agent module 124 and the second agent module 126). For example, a multitask command provided by a user can be parsed to determine the specific tasks for completing the multitask command, and at least two of the tasks can be simultaneously delegated to separate agent modules. In some implementations, outputs can be received from the separate agent modules and used to delegate another task to another agent module.

In some implementations, output can be provided from one or more of the agent modules and processed by the agent interaction engine 112. The output can correspond to a task completion indicator that includes information related to the task, or a request for more information for completing the task. For example, an agent module that has been delegated a task can query the automated assistant 104 to obtain additional information, and the automated assistant 104 can determine whether to obtain the additional information from the user or a separate agent module. If the automated assistant 104 determines that the additional information should be obtained from the user, the automated assistant 104 can cause a request to be provided at an automated assistant interface 114 of the client device 102. The request can be an audible output or a textual output that queries the user for the additional information. When the user provides the additional information to the automated assistant 104, the automated assistant 104 can treat the additional information as an input that is processed and thereafter provided to the agent module that requested the information, and/or any other agent module that might need the information. In some implementations, the agent module can receive an input from the automated assistant or another agent module, and invoke a separate agent module with parameters for completing a particular subtask. In this way, the agent module can at least temporarily "steer" an interaction, with the automated assistant acting as an intermediary.

In some implementations, the automated assistant 104 can determine that a separate agent module is more suitable for providing the additional information to the agent module requesting the additional information. In such instances, the agent selection engine 110 can identify the agent module that is most suitable for obtaining the additional information from. The identified agent module can then be queried by the automated assistant 104 for the additional information, and cause the identified agent module to either transmit the additional information to the automated assistant 104 and/or the requesting agent module.

Figure 2:
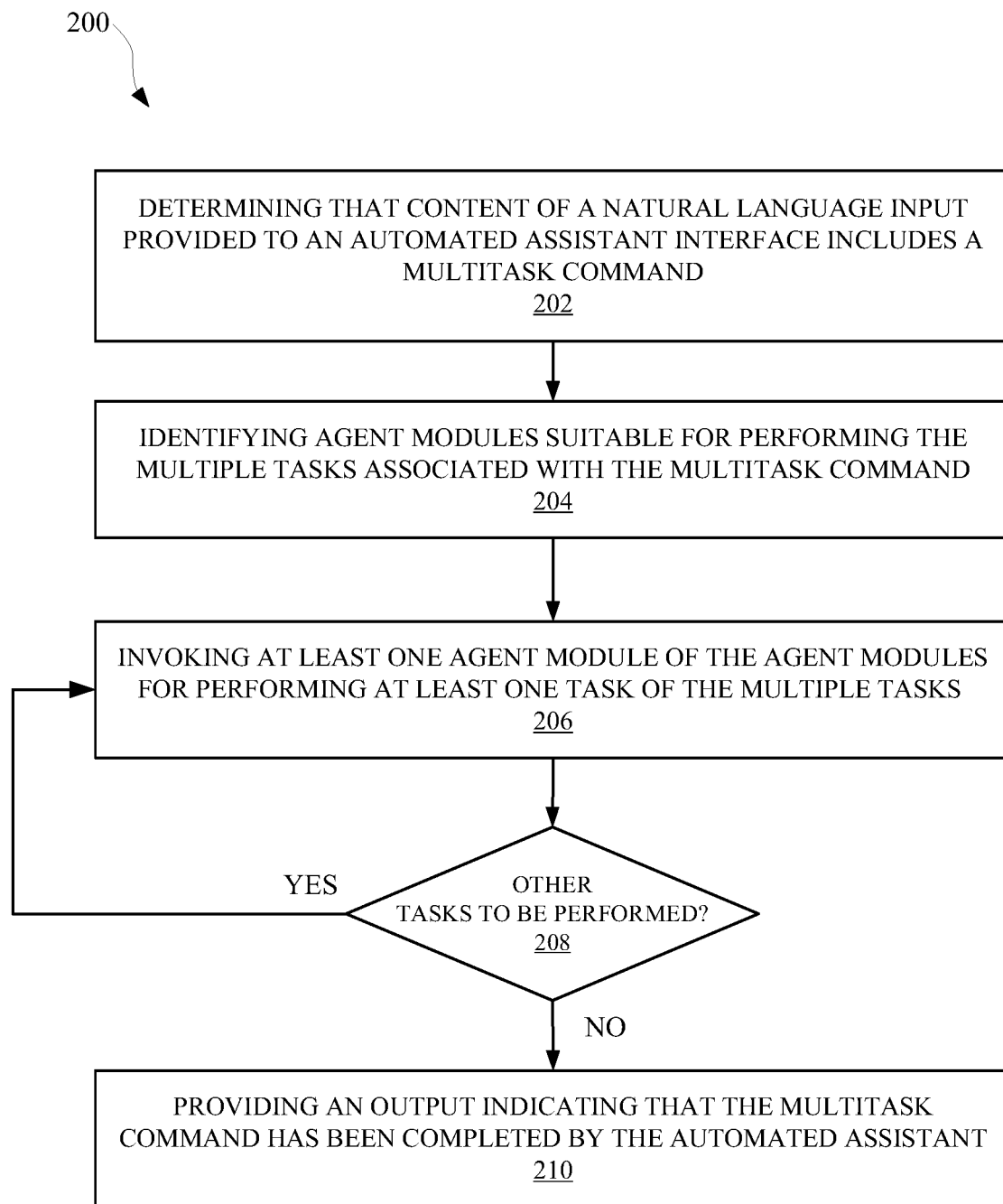
FIG. 2 illustrates a method for providing a command to an automated assistant that causes the automated assistant to invoke multiple different agent modules to perform different tasks for fulfilling the command.

FIG. 2 illustrates a method 200 for providing a command to an automated assistant that causes the automated assistant to invoke multiple different agent modules to perform different tasks for fulfilling the command. The method 200 can be performed by a client device, server device, and/or any other apparatus suitable for controlling an automated assistant. The method 200 can include a block 202 of determining that content of a natural language input provided to an automated assistant interface includes a multitask command. For example, the command can be a request for ordering ingredients, such as, "Assistant, please order the ingredients for my pad thai recipe." The command can be parsed by the automated assistant and the phrase "order the ingredients" can be identified as being a multitask command. The multitask command can be a command that is configured by the user at an automated assistant interface, or configured by the automated assistant based on a previous interaction between the user and the automated assistant. In some implementations, that multitask command can be preconfigured based on interactions between another user and an automated assistant, or multiple users and multiple automated assistants. For example, the automated assistant can access historical interactions between another user and another automated assistant to identify a multitask command that may be of interest to the user. The automated assistant can then associate the multitask command with the user and allow the user to invoke the automated assistant to perform various tasks in receiving the multitask command.

In response to receiving the multitask command, the automated assistant can, at block 204, identify one or more agent modules suitable for performing the multiple tasks associated with the multitask command. For example, the multitask command of "order the ingredients" can correlate to a spice ordering agent module, a produce ordering agent module, and a restaurant agent module. Each of the agent modules can be identified in an index that is accessible to the automated assistant and includes correlations between multitask commands and agent modules. The automated assistant can manage the index and add multitask commands whenever the user elects to have a group of commands to be stored as a single multitask command understood by the automated assistant.

At block 206, at least one agent module can be invoked for performing at least one task of the multiple tasks. For example, the spice ordering agent, which can be associated with a website for ordering spices, can be invoked by the automated assistant and queried to identify food ingredients that are available through the spice ordering agent module. The agent module can respond to the automated assistant with an indication that certain ingredients (e.g., vinegar and soy sauce) are available, and the automated assistant can respond with a request to order the ingredients. The ordering of these ingredients can mark the completion of at least some of the multiple tasks, and the automated assistant can then, at block 208, identify any remaining tasks for completion. If there are no remaining tasks, then, at block 210, the automated assistant can provide an output indicating that the multitask command has been completed by the automated assistant (e.g., "Your pad thai ingredients have been ordered").

If there are remaining tasks of the multitask command to be completed, then block 206 can be repeated and another agent module can be invoked for performing one or more of the remaining tasks of the multitask command. For example, the automated assistant can determine that there are remaining ingredients to be ordered (e.g., basil, rice noodles, peanuts, etc.), and invoke the produce ordering agent module for ordering the remaining ingredients. This can be a series invocation process where agent modules are invoked one after the other.

In some implementations, each agent module can be invoked simultaneously, and the responses from the agent modules can be used to determine how to continue interacting with the user and/or agent modules. For example, each of the spice ordering agent module, the produce ordering agent module, and the restaurant agent module can be simultaneously invoked and tasked with reporting whether they can provide all the ingredients. If the agent modules can collaboratively provide all the pad thai ingredients, then each agent module can be tasked with providing certain ingredients. However, if one or more tasks (e.g., ingredient orders) cannot be fulfilled by the agent module, the automated assistant can either query the user about how to proceed, or dynamically alter the tasks.

Tasks can be dynamically altered by the automated assistant in response to feedback from an agent module and/or the user. For example, if at least one of the ingredients is not available to the agent modules, the automated assistant can alter the tasks from ordering the individual ingredients to ordering a carryout order from the restaurant agent module. This decision by the automated assistant can be preconfigured by the user, or be based on past activities of the user (e.g., the user previously attempted to order pad thai ingredients, via the automated assistant, but then defaulted to ordering pad thai carry out). It should be noted that in some implementations and/or situations, task altering and delegation is performed in the background by the automated assistant and/or any agent modules invoked by the automated assistant. In this way, the user may only provide the command, "Assistant, order pad thai ingredients," and receive an output from the automated assistant such as "Ok, the ingredients are ordered," or "Ok, I ordered you pad thai carry out because ingredients were not available." This saves the user from having to recite each ingredient and prevents the automated assistant from having to process multiple different commands for each ingredient, thereby conserving computational recourses.

Figure 3:
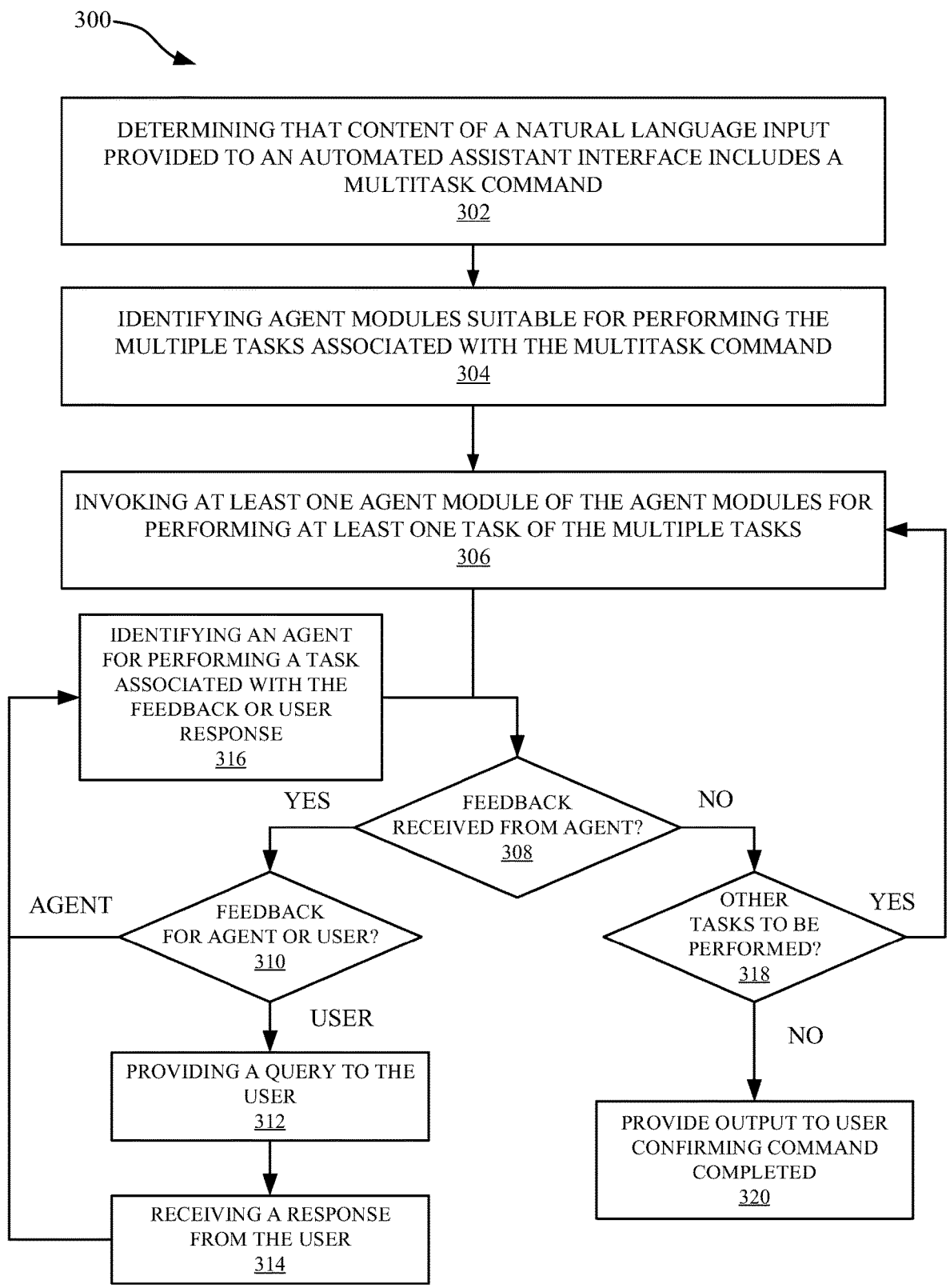
FIG. 3 illustrates a method for dynamically modifying tasks to be delegated to one or more agent modules based on feedback received from a user or an agent module.

FIG. 3 illustrates a method 300 for dynamically modifying tasks to be delegated to one or more agent modules based on feedback received from a user or an agent module. The method 300 can be performed by a client device, server device, and/or any other apparatus suitable for controlling an automated assistant. The method 300 can include a block 302 of determining that content of a natural language input provided by an automated assistant includes a multitask command. For example, the natural language input can be a spoken phrase from the user such as "Assistant, please plan a night out with my friends." The automated assistant can convert the natural language input into text and identify a multitask command within the text. The multitask command (e.g., "plan a night out with my friends") can be a command that was preconfigured collaboratively by the user and the automated assistant.

At block 304, the automated assistant can identify agent modules suitable for performing the multiple tasks associated with the multitask command. The agent modules can be applications loaded onto a client device associated with the user, or otherwise accessible to the automated assistant over a network (e.g., the internet). Each of the agent modules can be associated with a task to be performed for the completing the multitask command. For example, the multitask command, "plan a night out with my friends," can be associated with a social network agent module, a calendar agent module, and/or a restaurant agent module. The social network agent module can be associated with at least a task of identifying friends of the user; the calendar agent module can be associated with at least a task of identifying when the friends are free; and the restaurant agent module can be associated with at least a task of identifying restaurants to go out to.

At block 306, at least one agent module of the agent modules can be invoked for performing at least one task of the multiple tasks. For example, the social network agent module can be invoked and the automated assistant can use the agent module to identify friends to invite to the night out being planned by the automated assistant. The automated assistant can query the social network agent module regarding, for example, how many friends of the user live within the same city of the user. The agent module can provide, in response, a list of friends of the user that live in the same city as the user. At block 308, a determination is made whether the output received from the agent module is feedback. If the output (e.g., the list of friends) is not feedback, then the method 300 can proceed to block 318. At block 318, a determination is made whether there are other tasks to be performed to complete the multitask command. If there no other tasks to be completed, then the method 300 can proceed to block 320 where an output is provided, by the automated assistant, to the user confirming that the task was completed. However, if other tasks remain to be completed, then, block 306 can be repeated.

Block 306 can be repeated for performing another task (e.g., identifying when the friends are free) in the multiple tasks associated with the multiple task (e.g., plan a night out with friends) command provided by the user. For example, when the calendar agent module performs the task of identifying when friends are free, the calendar agent module can provide feedback indicating that all friends but one friend are available during an upcoming weekend. At block 308, a determination is made that feedback was provided from the agent module (e.g., the calendar agent module). The feedback can be provided to the automated assistant and the automated assistant can determine whether a response should be provided to the agent module from the user or another agent. For example, when the calendar agent module communicates to the automated assistant that one friend from the group of friends identified by the social network agent module is not free, the automated assistant can, at block 312, query the user regarding the feedback. Specifically, the automated assistant can query the user regarding whether it is ok to proceed with planning the night out without including the friend that is not available.

Thereafter, at block 314, a response can be received from the user. The user can indicate in the response that it is not okay to proceed without inviting the friend and, at block 316, an agent module (e.g., the calendar agent module) can be identified for performing a task associated with the user response. For example, the automated assistant can receive the response from the user and provide a supplemental task to the calendar agent module for identifying a time when at least the unavailable friend would be free. Should the calendar agent module provide an output that corresponds to feedback, then block 310 can be repeated. Otherwise, the method 300 can proceed to block 318 to determine whether other tasks are to be performed. If no other tasks are to be performed then, at block 320, the output can be provided by the automated assistant to confirm the completion of the command.

If there are other tasks (e.g., using the restaurant agent module to identify restaurants to go to), the method 300 can proceed to block 306. At block 306, a restaurant reservation can be made for the friends at the date provided by the calendar agent module. Thereafter, the method 300 can proceed to 308. If no other feedback is provided and no other tasks are to be performed, the method 300 can terminate at block 320, where output is provided to the user confirming the completion the command.

In some implementations, method 300 enables the user and/or an agent module to provide feedback to the automated assistant during the execution of the multitask command. Feedback can be provided from an agent module to the automated assistant, and the automated assistant can provide a response back to the same or a separate agent module. Alternatively, the feedback can be provided from an agent module to the automated assistant, and the automated assistant can query the user for a response, which can be provided back to the same agent module or a separate agent module. In this way, the user does not have to personally identify each suitable agent module to the automated assistant and/or individually control each agent module. Rather, these steps can be performed by the automated assistant, which can preserve computational resources given that less voice to text processing is necessary when the user is providing less commands.

Figure 4:
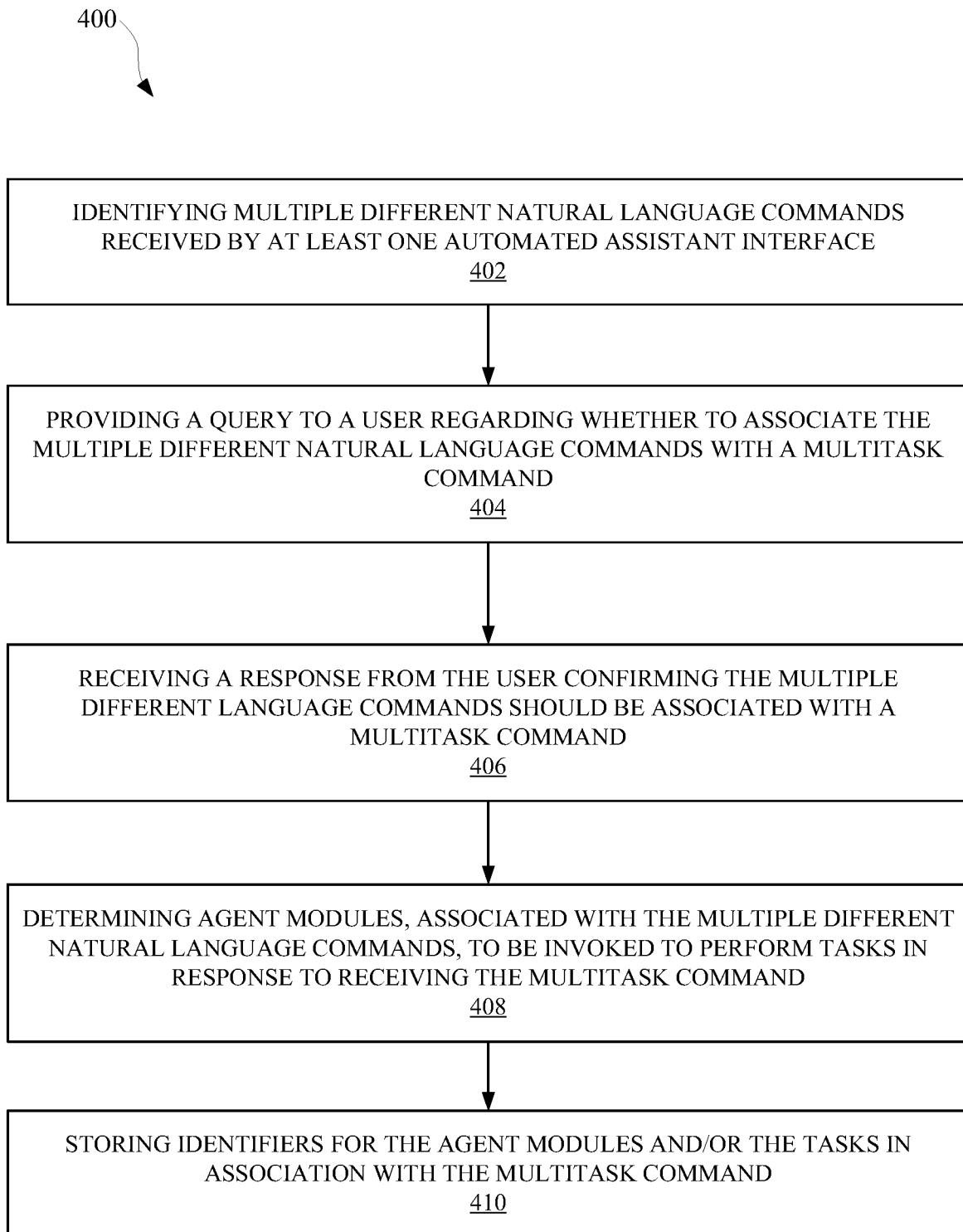
FIG. 4 illustrates a method for configuring a multitask command for invoking multiple different agent modules via an automated assistant.

FIG. 4 illustrates a method 400 for configuring a multitask command for invoking multiple different agent modules via an automated assistant. The method 400 can be performed by a client device, server device, and/or any other apparatus suitable for controlling an automated assistant. The method 400 can include a block 402 of identifying multiple different natural language commands received by at least one automated assistant interface. For example, the natural language commands can be spoken or textual commands such as "reserve a table at a nearby restaurant," "find a place to get drinks after dinner," and "send an invitation to my girlfriend." Each of these natural language inputs can be associated with a specific task that is undertaken by the automated assistant, which can delegate each task to a suitable agent module.

At block 404, a query is provided to a user regarding whether to associate the multiple different natural language commands with a multitask command. The multitask command can be a natural language input, such as an audible or textual word or phrase, that can be provided to the automated assistant interface for performing multiple different tasks. The multitask command can be provided by the user or generated by the automated assistant. For example, the user can be operating a graphical user interface (GUI) corresponding to the automated assistant interface, and type in each of the multiple different natural language commands. The automated assistant can provide a query to the user regarding whether the user would like to associate the multiple different natural language commands with a multitask command, which can also be provided by the user at the GUI. The multitask command can also be configured through a verbal interaction between the automated assistant and the user. For example, over the course of a week, the user can provide a variety of different natural language commands associated with a date night that the user is planning. The automated assistant can identify a commonality between the different natural language commands and, in response, provide the query to the user regarding associating the different natural language commands with a multitask command. The commonality can be content of the natural language commands (e.g., mentioning a date night in each command), a time or location associated with the natural language commands (e.g., mentioning the event time or location each command), a time or location associated with the user when providing the commands (e.g., each Monday after work the user plans the date night), and/or any other commonality that can be associated with natural language commands. For example, the commonality can be that each natural language command was provided within a threshold time of each other. Alternatively, the commonality can be that all the natural language commands were provided and resolved within a total threshold time period.

At block 406, a response can be received from the user confirming that the multiple different natural language commands should be associated with a multitask command. The user can provide such confirmation through the GUI (e.g., by typing in the multitask command "plan a date night"), or through a spoken command to the automated assistant. For example, the user can communicate the multitask command to the automated assistant by saying, "Assistant, please associate the date night tasks with the command: 'plan a date night.'" In response, at block 408, the automated assistant can determine agent modules, associated with the multiple different natural language commands, to be invoked to perform tasks in response to receiving the multitask command. For example, previously the user may have provided the command "reserve a table at a nearby restaurant." The command can be processed by the automated assistant and converted into a task that is delegated to a restaurant agent module. In a similar manner, the automated assistant can compile a list of tasks from the multiple different natural language commands. Thereafter, at block 410, the automated assistant can store identifiers for the agent modules and/or tasks in association with the multitask command (e.g., "plan a date night"). In this way, the user is able to invoke, via the automated assistant, multiple agent modules to perform different tasks. This can streamline various interactions between the user and the automated assistant, thereby saving the user time as well as conserving computational resources available to the automated assistant.

Figure 5:
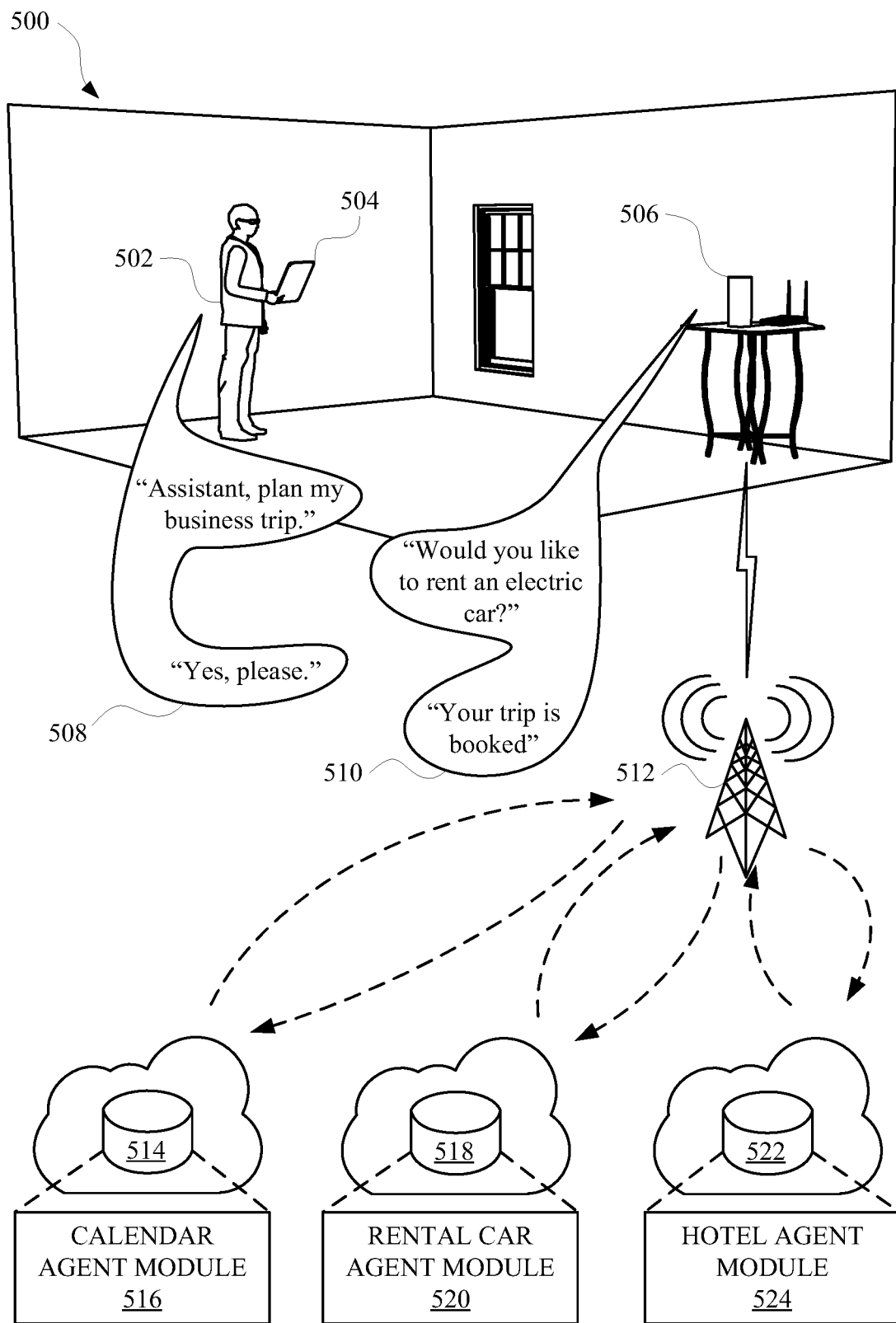
FIG. 5 provides a diagram that illustrates an example of a user invoking an automated assistant with a multitask command associated with multiple different agent modules.

FIG. 5 provides a diagram 500 that illustrates an example of a user 502 invoking an automated assistant with a multitask command associated with multiple different agent modules. Specifically, diagram 500 illustrates an example of a user 502 requesting that the automated assistant plan a business trip using the multitask command "Assistant, plan my business trip." The multitask command can be provided as a spoken user input 508 to a client device, such as a mobile device 504 or an assistant device 506, and the client device can transmit, over a network 512, the spoken user input 508 to a remote server that hosts an automated assistant application. The automated assistant application can determine that the phrase "plan my business trip" corresponds to a multitask command and identify the agent modules associated with completing the multitask command.

The automated assistant can access a storage that includes an index providing a correlation between multitask commands and agent modules available for completing the multitask command. For example, the index can include an entry that identifies the multitask command "plan my business trip" and corresponding entries that identify the agent modules that can be employed to complete subtasks of the multitask command. The agent modules can include a calendar agent module 516, a rental car agent module 520, and a hotel agent module 524. The automated assistant can further identify, from the index, the tasks involved with completing the multitask command. Such tasks can include: providing details of the business trip in a calendar managed by the user, reserving a rental car, and booking a hotel.

In some implementations, each task can be delegated in parallel, series, or a combination thereof to each of the agent modules. For example, the automated assistant can communicate with a first remote server 514 for delegating the task of finding the details of the business trip using a calendar agent module. In response to receiving the details of the business trip from the calendar agent module 516, the automated assistant can delegate the tasks of reserving the rental car and booking the hotel. Specifically, the automated assistant can communicate with a second remote server 518 for delegating the task of reserving the rental car to the rental car agent module 520, and communicate with a third remote server 522 for delegating the task of booking the hotel. Each of the tasks performed by the rental car agent module 520 and the hotel agent module 524 can be done so concurrently in order conserve time.

In some implementations, the automated assistant can collect information from one agent module and provide the information to another agent module. For example, the calendar agent module can complete the task of providing details of the business trip, and provide the details to the automated assistant. The automated assistant can parse the details and identify the details that would be relevant to the remaining tasks. The details can include a destination for the business trip and dates for the business trip. When the automated assistant delegates the tasks to the rental car agent module 520 and the hotel agent module 524, the automated assistant can include the location and the dates. In this way, the user 502 does not have to be queried to provide such details, and the automated assistant can preserve computational resources by not having to process unnecessary natural language inputs from the user 502.

In some implementations, the automated assistant can use environmental data, such as a current location of the user 502, to modify tasks to be delegated to the agent modules. For example, the automated assistant can determine a distance between a current location of the user 502 and the destination for the business trip. The rental car agent module 520 can receive the distance information from the automated assistant and query the automated assistant regarding whether the user would like to reserve an electric car because the distance is below a particular threshold. The automated assistant can, in response, generate a query as an output 510 for the user 502 (e.g., Would you like to rent an electric car?). Alternatively, the automated assistant can pass the query from the rental car agent module 520 to the user, thereby allowing the automated assistant to act as an intermediary between the user and the rental car agent module 520. If the user 502 provides a response confirming the electric car reservation (e.g., "Yes, please."), the automated assistant can communicate to the rental car agent module 520 that the user 502 would like an electric car. The rental car agent module 520 can then reserve a first type of electric car for the user 502 to drive to the destination for the business trip.

In some implementations, feedback from an agent module can be provided and used by the automated assistant to determine whether a previously performed task should be repeated. For example, the automated assistant can communicate to the hotel agent module 524 that the user 502 has booked the first type of electric car. The first type of electric car can include a charging receptacle that is not supported by a charging station at a hotel being booked by the hotel agent module 524. In response to the hotel agent module 524 determining this incompatibility, the hotel agent module 524 can provide an indication to the automated assistant 104 identifying the first type of electric car as one that is not supported by the chargers at the hotel. In response, the automated assistant 104 can delegate a supplemental task to the rental car agent module 520 for modifying the reservation to reserve a second type of electric car that is supported by the charging stations at the hotel. In response to the rental car agent module 520 reserving the second type of electric car, the automated assistant can direct the hotel agent module 524 to book the hotel and provide an output 510 to the user 502 indicating that the trip has been booked. This process allows for resolutions of conflicts between agents to be performed by the agent module with little or no interaction with the user 502. In this way, the user 502 is able to perform other actions while the automated assistant coordinates completion of tasks in the background.

Figure 6:
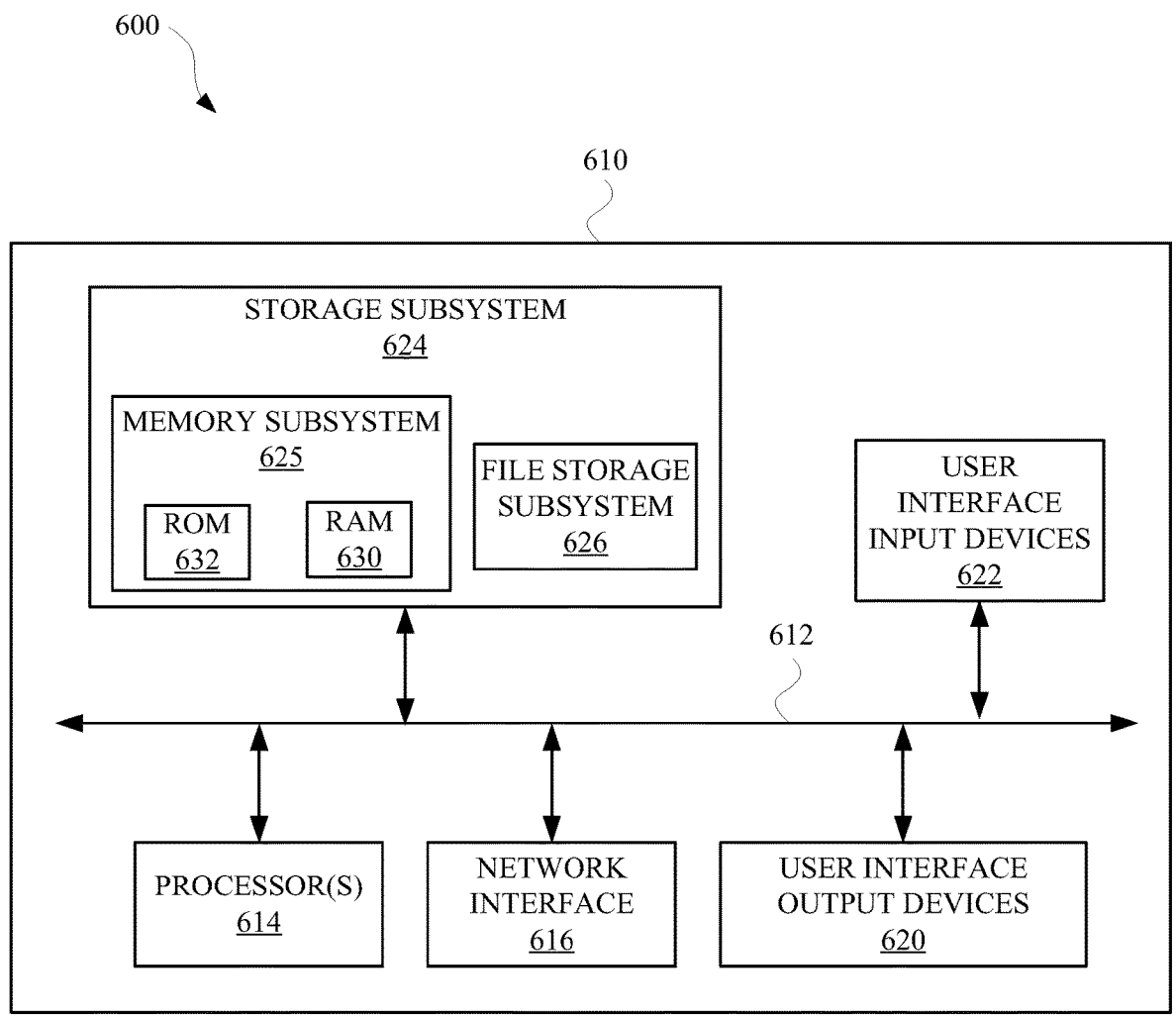
FIG. 6 is a block diagram of an example computer system.

FIG. 6 is a block diagram 600 of an example computer system 610. Computer system 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of methods 200, 300, and/or 400, and/or to implement one or more of the automated assistant 104, voice to text engine 106, text parser engine 108, agent selection engine 110, agent interaction engine 112, client device, server device, remote device, and/or any other apparatus or process discussed herein.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
    determining a correlation between a first spoken utterance and a second spoken utterance during previous interactions between a user and an automated assistant via an automated assistant interface,
        wherein determining the correlation is based on a temporal relationship between the first spoken utterance and the second spoken utterance in each of the previous interactions,
        wherein the first spoken utterance causes the automated assistant to initialize execution of multiple tasks performed by separate agent modules that include a first agent module and a second agent module, and
        wherein the second spoken utterance causes the automated assistant to initialize execution of an additional task performed by an additional agent module;
    prompting, based on determining the correlation between the first spoken utterance and the second spoken utterance, the user regarding a preconfigured multitask command,
        wherein the preconfigured multitask command corresponds to the multiple tasks and the additional task, and
        wherein the prompting is performed without an explicit request, from the user to the automated assistant, to initialize generation of the preconfigured multitask command; and
    subsequent to prompting the user regarding the preconfigured multitask command:
        determining that content of a natural language input provided to the automated assistant interface identifies the preconfigured multitask command;

invoking the first agent module of the separate agent modules to perform a first task of the multiple tasks and the additional agent module to perform the additional task;
in response to invoking the first agent module and the additional agent module, receiving a first agent output from the first agent module and an additional agent output from the additional agent module;
invoking, with parameters based on the first agent output, the second agent module of the separate agent modules to perform a second task of the multiple tasks, wherein the second task involves processing the parameters,
wherein invoking the second agent module with the parameters based on the first agent output includes incorporating at least some of the first agent output into one or more of the parameters and providing, by the automated assistant, the parameters to the second agent module;
in response to invoking the second agent module, receiving a second agent output from the second agent module; and
providing responsive output to the user, via the automated assistant interface, based on the first agent output, the second agent output, and the additional agent output.

2. The method of claim 1, wherein determining that the content of the natural language input includes the preconfigured multitask command comprises:
comparing the content to entries in an index that correlates stored commands to the preconfigured multitask command.

3. The method of claim 1, wherein determining the correlation between the first spoken utterance and the second spoken utterance includes:
determining that the temporal relationship between the first spoken utterance and the second spoken utterance indicates that the first spoken utterance and the second spoken utterance were provided within a threshold period of time.

4. The method of claim 1, wherein the responsive output corresponds to a query for the user and further comprising:
receiving, at the automated assistant interface, an input from the user in response to the query; and
causing the second agent module to process the input from the user.

5. The method of claim 4, wherein the second agent module provides feedback to the automated assistant in response to processing the input from the user, and the method further comprises:
in response to the feedback satisfying one or more criteria:
invoking, with parameters based on the feedback, a third agent module to perform a third task of the multiple tasks.

6. The method of claim 1, wherein determining the correlation between the first spoken utterance and the second spoken utterance is performed before the user has provided the natural language input that identifies the preconfigured multitask command.

7. The method of claim 1,
wherein the natural language input is a single spoken natural language input, and the content of the single spoken natural language input is different from other natural language content verbally provided by the user to the automated assistant during one or more of the previous interactions.

8. The method of claim 7,
wherein invoking the first agent module of the separate agent modules to perform the first task of the multiple tasks includes communicating with a remote server that is separate from a client device that includes the automated assistant interface; and
wherein invoking the second agent module of the separate agent modules to perform the second task of the multiple tasks includes communicating with a different remote server that is separate from the client device.

9. The method of claim 7, wherein the first agent module and the second agent module are both invoked at least partially in response to the automated assistant interface receiving the single spoken natural language input.

10. The method of claim 1, wherein the preconfigured multitask command is previously stored in response to the automated assistant previously generating the preconfigured multitask command.

11. A system, comprising:
one or more processors; and
memory storing instructions that, when executed by one or more of the processors, cause one or more of the processors to perform operations that include:
determining a correlation between a first spoken utterance and a second spoken utterance during previous interactions between a user and an automated assistant via an automated assistant interface,
wherein determining the correlation is based on a temporal relationship between the first spoken utterance and the second spoken utterance in each of the previous interactions,
wherein the first spoken utterance causes the automated assistant to initialize execution of multiple tasks performed by separate agent modules that include a first agent module and a second agent module, and
wherein the second spoken utterance causes the automated assistant to initialize execution of an additional task performed by an additional agent module;
prompting, based on determining the correlation between the first spoken utterance and the second spoken utterance, the user regarding a preconfigured multitask command,
wherein the preconfigured multitask command corresponds to the multiple tasks and the additional task, and
wherein the prompting is performed without an explicit request, from the user to the automated assistant, to initialize generation of the preconfigured multitask command; and
subsequent to prompting the user regarding the preconfigured multitask command:
determining that content of a natural language input provided to the automated assistant interface identifies the preconfigured multitask command;
invoking the first agent module of the separate agent modules to perform a first task of the multiple tasks and the additional agent module to perform the additional task;
in response to invoking the first agent module and the additional agent module, receiving a first agent output from the first agent module and an additional agent output from the additional agent module;
invoking, with parameters based on the first agent output, the second agent module of the separate agent modules to perform a second task of the multiple tasks, wherein the second task involves processing the parameters,
wherein invoking the second agent module with the parameters based on the first agent output includes incorporating at least some of the first agent output into one or more of the parameters and providing, by the automated assistant, the parameters to the second agent module;
in response to invoking the second agent module, receiving a second agent output from the second agent module; and
providing responsive output to the user, via the automated assistant interface, based on the first agent output, the second agent output, and the additional agent output.

12. The system of claim 11, wherein the first task or the second task is associated with booking a reservation for the user.

13. The system of claim 11, wherein determining the correlation between the first spoken utterance and the second spoken utterance includes:
determining that the temporal relationship between the first spoken utterance and the second spoken utterance indicates that the first spoken utterance and the second spoken utterance were provided within a threshold period of time.

14. The system of claim 11, wherein the operations further include:
providing, via the automated assistant interface, a query to the user regarding the output; and
receiving a subsequent user input from the user, wherein one or more of the parameters provided to the second agent module are based at least in part on the subsequent user input received from the user.

15. The system of claim 11, wherein determining the correlation between the first spoken utterance and the second spoken utterance is performed before the user has provided the natural language input that identifies the preconfigured multitask command.

16. A non-transitory computer readable medium configured to store instructions that, when executed by one or more processors, cause the one or more processors to perform operations that include:
determining a correlation between a first spoken utterance and a second spoken utterance during previous interactions between a user and an automated assistant via an automated assistant interface,
wherein determining the correlation is based on a temporal relationship between the first spoken utterance and the second spoken utterance in each of the previous interactions,
wherein the first spoken utterance causes the automated assistant to initialize execution of multiple tasks performed by separate agent modules that include a first agent module and a second agent module, and
wherein the second spoken utterance causes the automated assistant to initialize execution of an additional task performed by an additional agent module;
prompting, based on determining the correlation between the first spoken utterance and the second spoken utterance, the user regarding a preconfigured multitask command,
wherein the preconfigured multitask command corresponds to the multiple tasks and the additional task, and
wherein the prompting is performed without an explicit request, from the user to the automated assistant, to initialize generation of the preconfigured multitask command; and
subsequent to prompting the user regarding the preconfigured multitask command:
determining that content of a natural language input provided to the automated assistant interface identifies the preconfigured multitask command;
invoking the first agent module of the separate agent modules to perform a first task of the multiple tasks and the additional agent module to perform the additional task;
in response to invoking the first agent module and the additional agent module, receiving a first agent output from the first agent module and an additional agent output from the additional agent module;
invoking, with parameters based on the first agent output, the second agent module of the separate agent modules to perform a second task of the multiple tasks, wherein the second task involves processing the parameters,
wherein invoking the second agent module with the parameters based on the first agent output includes incorporating at least some of the first agent output into one or more of the parameters and providing, by the automated assistant, the parameters to the second agent module;
in response to invoking the second agent module, receiving a second agent output from the second agent module; and
providing responsive output to the user, via the automated assistant interface, based on the first agent output, the second agent output, and the additional agent output.

17. The non-transitory computer readable medium of claim 16, wherein determining that the content of the natural language input includes the preconfigured multitask command comprises:
comparing the content to entries in an index that correlates stored commands to the preconfigured multitask command.

18. The non-transitory computer readable medium of claim 16, wherein each of the first agent module and the second agent module are third-party agent modules controlled by separate third-parties that are unique from a party that controls the automated assistant.

19. The non-transitory computer readable medium of claim 16, wherein the operations further include:
identifying, based on the content of the natural language input, the first agent module and the second agent module via an index that correlates the first agent module and the second agent module with the multiple tasks.

20. The non-transitory computer readable medium of claim 16, wherein the multiple tasks are associated with individual phrases previously provided by the user and stored by the automated assistant.

* * * * *